Aug. 15, 1944.   F. S. DUNLEAVEY ET AL   2,355,788
ELECTROLYTIC CAPACITOR
Filed Dec. 12, 1940   2 Sheets-Sheet 1
Fig. 1.
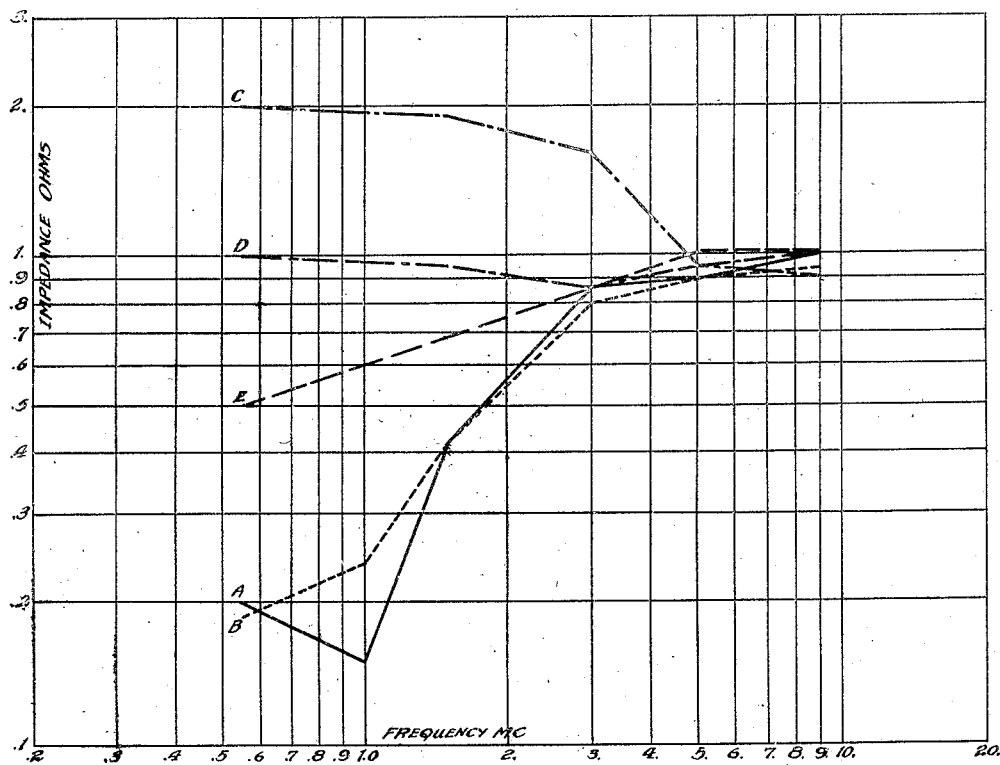
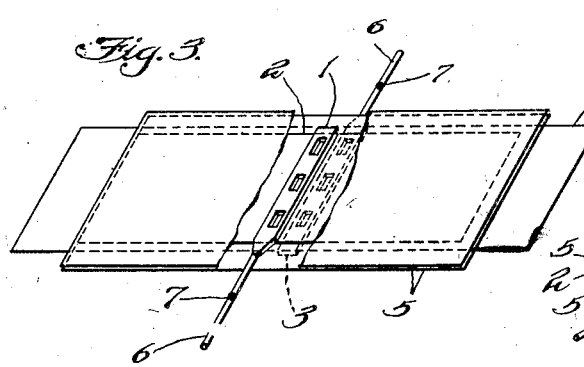
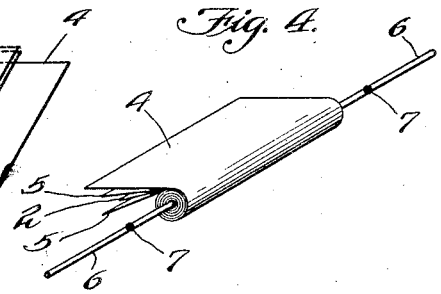
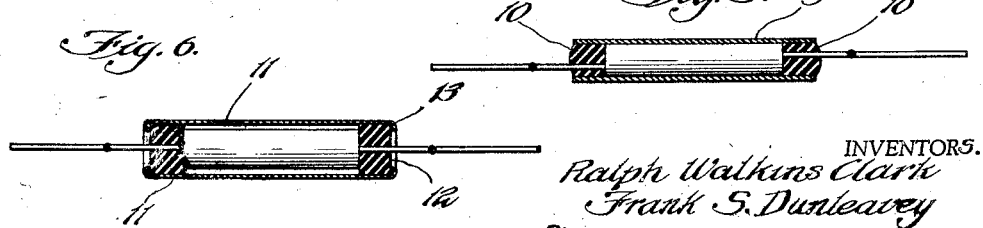
INVENTORS.
Ralph Watkins Clark
Frank S. Dunleavey
BY Parkinson & Lane ATTYS.

INVENTORS.
Ralph Watkins Clark
Frank S. Dunleavey
BY Parkinson & Lane ATTYS.

Patented Aug. 15, 1944

2,355,788

UNITED STATES PATENT OFFICE 2,355,788

ELECTROLYTIC CAPACITOR

Frank S. Dunleavey and Ralph Watkins Clark, Fort Wayne, Ind., assignors, by mesne assignments, to The Magnavox Company, Fort Wayne, Ind., a corporation of Delaware Application December 12, 1940, Serial No. 369,816

3 Claims. (Cl. 175—315)

This invention relates to electrolytic capacitors and more particularly to electrolytic capacitors which are adapted to operate as bypass capacitors in radio apparatus and like apparatus to provide low impedance paths for currents of frequencies in the standard broadcast range or higher.

It is an object of the present invention to provide a capacitor having a low impedance of substantially constant value over a wide range of frequencies. Heretofore, this end has been sought by the employment of a plurality or battery of capacitors which has complicated the structure in which they have been employed, increased the cost and led to uncertainty in result and unreliability in operation. The present invention solves the problem by providing a unitary structure of small volume which will be effective over the wide range above set forth.

A further object of the invention is to provide a capacitor which is eminently effective in the task of suppressing undesirable voltages which cause noise in the apparatus, particularly those arising from use of the apparatus in the neighborhood of ignition systems of airplane engines, automobile engines, and the like.

A still further object of the invention is the provision of a capacitor having characteristics which render it more suitable for the bypassing of spurious "hash" voltages from conductors such as those which arise from the mechanical interrupter types of rectifiers ordinarily used in battery-operated radio sets, amplifiers, and the like.

Again, another object of this invention is to construct a capacitor which is particularly suited, because of its low impedance over a wide range of frequencies, for any bypassing function in its frequency band.

With the above and other objects in view, the invention will now be described with reference to the accompanying drawings, in which:

Figures 1 and 2 illustrate a plurality of impedance frequency curves of electrolytic capacitors of the prior art and of those of the present invention for the purpose of comparison and with the aid of which the advantages of the present capacitor may be more readily appreciated;

Figure 3 is a view in perspective illustrating the various elements of a capacitor according to the invention and their positioning relative to each other;

Figure 4 is a similar view to Figure 3 illustrating a subsequent stage in the manufacture of the capacitor;

Figure 5 is a sectional view taken longitudinally through a capacitor of the invention showing one form of casing with which the capacitor may be provided; and Figure 6 is a similar view to Figure 5 showing a modified form of casing for the capacitor.

Figure 2:
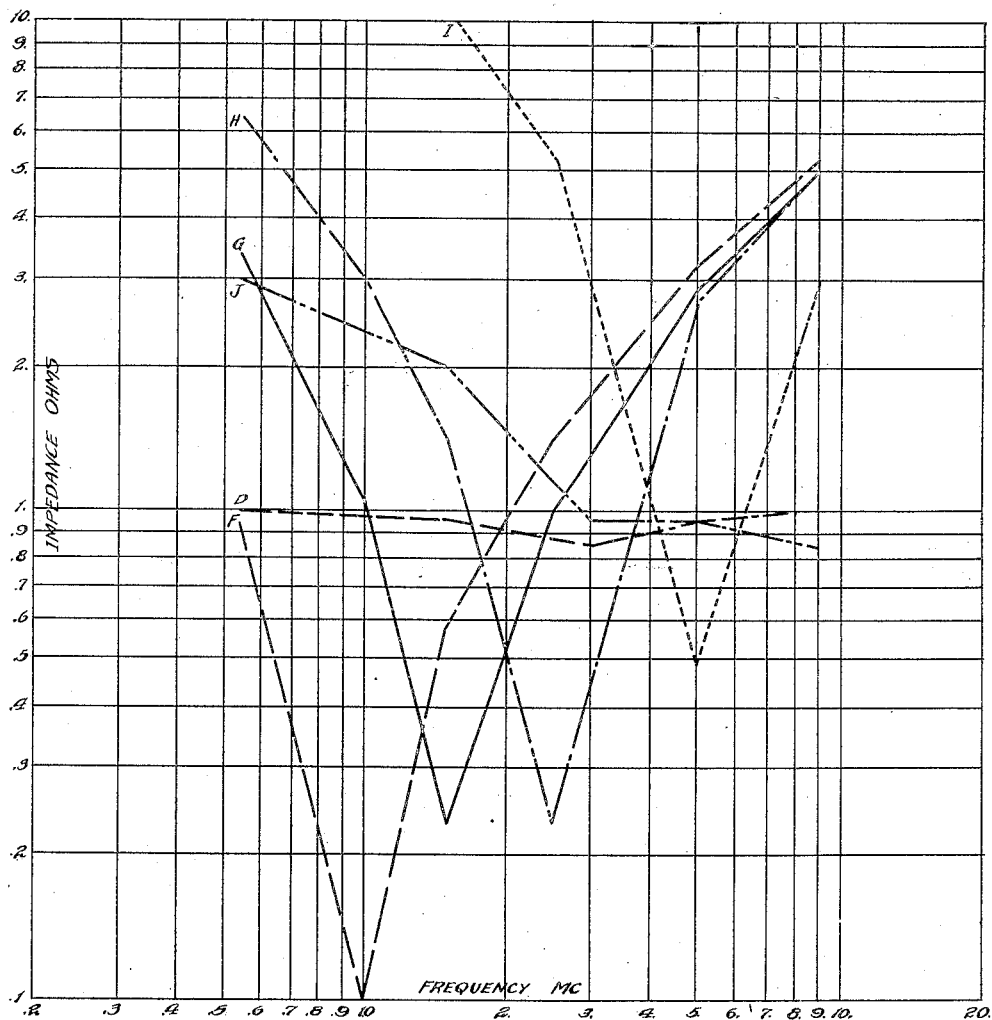

In Figure 1 the reference A designates the impedance-frequency curve of a capacitor of the prior art constructed of thin foil electrodes with a dielectric of wax impregnated paper. The dimensions of such electrodes usually are in the neighborhood of 1" or 1½" wide, and, because of the low dielectric constant of the wax impregnated paper, the other dimension of the capacitor must be exceedingly long—usually in the neighborhood of 100" or more.

An inspection of the curve will show that the impedance of the capacitor falls off very rapidly as is well known to those skilled in the art.

The impedance of a capacitor whose losses are small compared with that impedance should fall off theoretically in approximate accordance with the reactance which is determined by the formula $$X_c = \frac{1}{2\pi f c}$$

where $c$ equals the capacitance in farads and $f$ is the frequency in cycles per second. In accordance with this theory the capacitive reactance should become infinitely small at infinite frequency.

From a practical point of view, however, any capacitor whose electrode dimensions are large, and which must handle currents of relatively high frequencies, such as over the band with which the present invention is concerned, namely from 550 k. c. to 5 m. c., will have appreciable inductance. At some frequency, the inductive reactance will become equal to the capacitive reactance, and at this point, the capacitor will have a minimum impedance largely determined by its losses. At frequencies above this value, the capacitor behaves like an inductance in that the impedance increases in proportion to frequency.

The capacitor of curve A of Figure 1 has an impedance of .15 ohm at one mega-cycle at which frequency the minimum impedance is observed. Above the frequency of one mega-cycle, the capacitor is becoming inductive. Such a capacitor has undesirable characteristics, as not only does the impedance increase, but it is not constant in value over the frequency band, and when such a capacitor exhibits inductive properties, an external magnetic field is produced which increases the ability of the device to radiate energy to other circuits by electro-magnetic means.

Curve B of Figure 1 shows the impedance of a one-half microfarad paper capacitor which, because of its increased electrode length, has a resonance both at the low edge, or below 550 k. c., and increases with frequency above this value and thus exhibits the normal behavior of an inductive reactance.

Curves C, D and E show the impedance-frequency curves of electrolytic bypass capacitors built in accordance with this invention. The impedance of the unit to which the curve E applies is substantially constant with increasing frequency between 5 and 9 megacycles; the impedance of the unit to which curve C applies still decreases slightly with increasing frequency, even up to frequencies as high as 9 megacycles; and the impedance of the unit to which curve D applies decreases slightly with increasing frequency up to 3 megacycles and then increases but very slightly up to 9 megacycles.

The capacitor of curve C has an electrode dimension of 1" wide by 1" long, giving the total active surface of 2 square inches; that of curve D has an electrode dimension of four square inches proportioned one inch wide by two inches long; and that of curve E has eight square inches proportioned one inch wide by four inches long.

Curve D is particularly characteristic of the capacitor of this invention in that it possesses the advantage that the impedance decreases with frequency throughout the band at 550 k. c. to 9 m. c. with the impedance range approximately constant in the narrow limits of 0.85 ohm to 1.0 ohm.

Referring to Figure 2, curves F, G, H and I are those of paper bypass capacitors of the wax impregnated paper dielectric type in the range of 0.05 to 0.25 microfarad. The difference between the capacitors of the prior art as represented by the said four curves, and the impedance-frequency characteristic of curve D of Figure 1 which is reproduced for the purpose of comparison will at once be apparent.

It should be pointed out that curves F to I of Figure 2 are more representative of the impedance-frequency characteristics of prior art capacitors than are curves A and B of Figure 1 wherein the units from which said curves were obtained were more particularly designed in order to obtain better impedance-frequency curves than are obtained from the prior art capacitors as ordinarily constructed and marketed.

With regard to curve J of Figure 2, which is also characteristic of a capacitor constructed according to this invention, it will, for convenience, be discussed hereinafter.

The materials used in making capacitors in accordance with this invention do not differ from those used in the art from the point of view of purity and general physical and chemical characteristics. There are, however, certain mechanical characteristics which characterize the capacitor of this invention and which impart to it the desired impedance-frequency curve.

The electrodes are made of film-forming material such as aluminum and such, for example, as from .001" foil. One or both of the electrodes in the capacitor may be formed with a dielectric film such as an electrolytically formed oxide film, as is conventional in the art of making electrolytic capacitors. For most purposes it will be found sufficient to so form only one electrode as the capacitor is subjected only to pulsating voltage waves, and not to alternating voltage waves. The electrode surface may be that of plain aluminum foil, or it may be etched, or the surface may be composed of a sprayed film-forming material which has been deposited upon a fabric, such as is described in the U. S. Patent No. 2,104,018, issued to Joseph B. Brennan on January 4, 1938.

One of the features which characterizes and is essential in the capacitor of this invention is a small electrode area in the range of four to eight square inches of total active surface, which, when properly arranged from a mechanical viewpoint, and with the proper spacer and electrolyte medium, will provide satisfactory impedance-frequency characteristic of the order shown in curve D of Figure 1. It is not essential to the invention that plain surface electrodes be used, but they are to be preferred as for the desired area, they are the least expensive of the above mentioned electrode surfaces, and the etching or sprayed metal surfaces contribute extra capacitances beyond that already provided by the filmed plain surface anode. Such extra capacitance decreases the impedance of the capacitor at audio-frequency without impairing the radio frequency characteristics as shown by curve D of Figure 1. Hence there is no point in employing etched or sprayed metal electrodes having greater actual surface area in place of the plain surface, unless an improved low frequency characteristic is needed.

In making a capacitor in accordance with this invention, the method of connecting terminals to the electrodes is quite important in order that all inductive effects be reduced to negligible level under the frequency in which the capicitor is designed to work. As shown in Figure 3, this is accomplished by attaching the terminal tab 1 to the center of the electrode 2 and attaching the other terminal tab 3 of the capacitor to the cathode or second filmed electrode 4. These terminal tabs must be firmly attached or staked to their respective electrodes, and each must be located in the center of its own electrode. The electrodes are separated by absorbent paper spacers 5 such as are well known in the art.

The terminal leads 6 preferably consist of 18 gauge tin copper wire which are butt-welded at the joints 7 to the terminal tabs which, in turn, preferably consist of a 15 gauge aluminum wire which has been flattened to a thickness of about .005". This is done to facilitate the staking which is accomplished by a piercing of the flattened wire portion at several points and anchoring the metal pierced through the electrode by applying pressure to the flattened ears over against the electrode face.

The advantages of the bi-metal tab just described may be briefly outlined as follows:

It has been a necessary practice in the art to employ aluminum, or other film-forming metals, in contact with the film-forming anodes and the electrolyte in order that a voltage could be sustained across the cell. Tabs of non-film forming metal in contact with the electrolyte in the capacitor rolls would short circuit the capacitor and render it useless. Aluminum tabs have been commonly used in the art for the above reason. However, it has usually been necessary to attach terminals, or lead wires, which can be readily soldered with the usual rosin core lead tin solders usually used in the assembly of capacitors and other radio apparatus, and the like. It has therefore been the usual practice to attach tinned copper leads, or tinned steel terminals, to tabs by employing rivets, eyelets, and other mechanical means employing a third member to join the aluminum tab to a tinned copper lead.

In the tab construction shown in Figure 3 an aluminum wire is employed for that proportion of the terminal tab which extends within those portions of the capacitor where the electrolyte may come into contact with the tab. The inner portion of the wire is flattened to increase the area of contact available on staking the flattened portion to the electrode.

In the method of this invention, we attach the preferred external lead wires of tinned copper by butt-welding the lead wire to the end of the aluminum wire which extends from the capacitor roll. Such a method of tab assembly has the advantage of having practically no appreciable greater bulk than the volume needed by the wires themselves, and is practically adaptable to the capacitor of this invention to reduce its over-all dimensions, but is equally applicable to all electrolytic capacitors, either large or small in electrical or physical size. It is also possible to butt-weld not only tinned solid copper wires, as shown in Figure 3, but tinned stranded copper wires as well.

Terminals of special design could also be made which could be butt-welded to the aluminum wire leads.

The use of the welded connection between the tinned copper leads and the aluminum tab may be made by spot-welding the lead to any surface of the tab, and the tab may have different geometry than shown. For example:

There may be a straight piece of .010" foils $\frac{3}{32}$" wide and the tab spot welded to the outer end which extends beyond the capacitor roll, or the tab may be a .020" x $^{11}/_{64}$" rectangular piece of ribbon with the lead spot welded or butt-welded to that portion extending out beyond the capacitor roll. Such variations in tab to lead assembly are intended to be included as variations in the method shown in Figure 3.

The spacers between the electrodes preferably consist of two sheets of .001" absorbent tissue of a long fibered sheet having density of .3 to .4 and a porosity of 100 cc. in 115 seconds. If such a capacitor is to be operated in a position in a circuit wherein the capacitor may be subjected to excessive surge current, then the spacer construction as outlined in Frank S. Dunleavey's copending application, Serial No. 343,835, filed July 3, 1940, may be employed.

The entire assembly is arranged as shown in Figure 3, and the left hand edge is given a full turn around a small diameter winding mandrel. The second electrode and all separators are inserted between the edge of the electrode and the mandrel, and the usual rolling operation is then performed. It is essential in performing this operation that the center line of the tab of one electrode will be directly above or below the center line of the opposite electrode. The capacitor is then suitably clamped or taped to prevent its unrolling. It is usual to have the electrode terminals 6 extending in opposite directions, as shown for convenience in mounting and ease in construction. However, it is not impractical, nor does it effect the characteristics of the capacitor, if both electrode terminals protrude from the capacitor roll at the same end.

The capacitor is then impregnated with electrolyte whose conductivity is suitable for the polarizing voltage to be applied to the capacitor, and whose conductivity is low enough to give the minimum impedance required.

The part which the electrolyte plays in obtaining a capacitor having the characteristics aimed at by the invention is also important, it determining the magnitude of the impedance at the low frequency end of the curve—that is, whether the capacitor possesses an impedance value at the low end of the chosen frequency band of, say, one ohm, or three ohms, or ten ohms. For example:

The capacitor of curve J of Figure 2 has identical plate area and geometrical construction to the capacitor as represented by curve D, the difference between the two capacitors being that electrolytes of different conductivities were employed in their manufacture. The capacitor of curve J had an electrolyte whose conductivity at 100° C. is 170 ohms per centimeter cube, whereas the capacitor of curve D has an electrolyte whose conductivity is 50 ohms per centimeter cube at 100° C. Electrolyte of lower conductivity can be used, but will produce less desirable impedance-frequency curves.

The geometry, which has been made a part of this construction, determines the characteristic more than the conductivity of the electrolyte at the higher frequencies between 3 and 9 megacycles.

The preferred electrolyte is an ethylene glycol base electrolyte having 567 grams of boric acid and 133 c. c. of 28% ammonia water dissolved in 640 c. c. of ethylene glycol. Such a mixture, on boiling to temperatures in the range of 120 to 135° C. will have conductivity suitable for the capacitors of this invention. We prefer, for capacitors of 100 volts D. C. working, or less, an electrolyte boiled to 120° C. The second electrolyte, which has been found equally suitable, is the use of the substitution of 22.8%, by weight, of mannitol for ethylene glycol.

The unit is preferably rolled dry and impregnated in the above electrolyte by submersion in the electrolyte which is maintained at temperature of approximately 100° C. After impregnation, the capacitor is aged at D. C. working voltage for sufficient time to have the direct current leakage less than one-tenth milliampere at a temperature between 60 and 85° C.

The capacitor structure so formed can now be cased in any one of a number of different casing means that are known in the art, such as metal tubes and cardboard containers of various sorts. However, it is preferred, as shown in Figure 5, to case such units in a cardboard tube 9 having a very low vapor and ion transmission as is described in my application, Serial No. 290,004, filed August 14, 1939. The ends of the tube are closed with an asphalt base potting material 10 having good adhesion to the tube, and having low impurities such as water soluble chlorides, sulphates, nitrates which might contaminate the electrolyte.

Another form of casing means which is suitable for housing the capacitor of this invention is shown in Figure 6. This form comprises a thin wall aluminum tube 11 in which the capacitor is inserted, the ends being closed by rubber grommets 12 which have a single hole located in the center which is just large enough to slide over the terminal wires and seal them against leakage of the electrolyte to the exterior, or leakage of moisture vapor from the air to the interior. The grommets are held in place by spinning over the edge 13 against the rubber.

Figure 7:
Figure 7 is also a view similar to Figure 5 showing still another form of casing for the capacitor.

A still further form of casing which is suitable for housing the capacitor is shown in Figure 7 and consists of a thermo-plastic tube which, for example, is cellulose acetate-butyrate. This tube is just large enough to receive the capacitor. The ends of the tube are then subjected to heat in the order of 250–200° F. and while so heated, put under sufficient pressure to cause the heated ends to bond and close the end of the tube around the terminal wires, and to seal the tube against leakage of the electrolyte to the exterior, or leakage of moisture-vapor into the tube.

We claim:

1. A unitary capacitor structure adapted to provide an impedance on the order of 1.0 ohm over a frequency range of 0.55 to 10 mega-cycles comprising, in combination, opposed film forming electrodes at least one of said electrodes having a dielectric film formed thereon, terminals for said electrodes, each terminal being attached to the center of its respective electrode and the terminal of one of said electrodes being non-inductively located with respect to the terminal of the opposing electrode, said electrodes having a total active area on the order of four to eight square inches, and a length on the order of two to four inches, and a spacing means for said electrodes thoroughly impregnated with electrolyte having resistance value on the order of 50 ohms per centimeter cube at 100° C.

2. A capacitor comprising opposing film forming electrodes and terminals therefor and having a low impedance on the order of $\frac{1}{10}$ to three ohms over a wide range of frequency on the order of .55 to 10 megacycles, one of said electrodes having a dielectric film formed thereon, the terminal of said last-mentioned electrode being non-inductively located with respect to the opposing electrode and each terminal being attached to the center of its respective electrode, its total area being within the range of four to eight square inches and its length being not more than four times greater than its width, and a paper spacing means separating said electrodes thoroughly impregnated with an electrolyte whose conductivity is in the order to 50 to 170 ohms per centimeter cube at 100° C.

3. An electrolytic capacitor comprising two electrodes each made of .001" aluminum foil 1" wide by 3" long, a terminal tab of 15 gauge flattened aluminum wire firmly staked to the center of each of said electrodes, a spacer between the electrodes consisting of two sheets of .001" absorbent tissue having a density of .3 to .4 and a porosity of 100 c. c. in 115 seconds, and an electrolyte having a conductivity within the range of 50 and 170 ohms per centimeter cube at 100° C.

FRANK S. DUNLEAVEY.
RALPH WATKINS CLARK.